A. E. WALE.
METHOD FOR MAKING TIRES.
APPLICATION FILED FEB. 10, 1911.

1,083,231.

Patented Dec. 30, 1913.

2 SHEETS—SHEET 1.

Witnesses

Inventor
Alfred E. Wale
By
Attorney.

A. E. WALE.
METHOD FOR MAKING TIRES.
APPLICATION FILED FEB. 10, 1911.

1,083,231.

Patented Dec. 30, 1913.

2 SHEETS—SHEET 2.

Witnesses.

Inventor
Alfred E. Wale
By B. Singu
Attorney.

UNITED STATES PATENT OFFICE.

ALFRED EDMUND WALE, OF BIRMINGHAM, ENGLAND.

METHOD FOR MAKING TIRES.

1,083,231.  Specification of Letters Patent.  Patented Dec. 30, 1913.

Application filed February 10, 1911. Serial No. 607,772.

*To all whom it may concern:*

Be it known that I, ALFRED EDMUND WALE, a subject of the King of Great Britain, residing at Birmingham, England, have invented a new and useful Method for Making Tires, of which the following is a specification.

This invention relates to a method for manufacturing tires and has for its object to provide a tire which cannot be cut by sharp objects on the road and which is not liable to skid or side slip.

The invention refers to that type of tires in which metal fabric is incorporated with or used in conjunction with the rubber and canvas and has as its particular object the production of a tire in which a fabric composed of interwoven wire helices is combined with the rubber, the axes of the helices of the interwoven fabric being disposed radially in the compound tire.

In accordance with the present invention I first weave a sheet of wire fabric, consisting of interwoven helical wire coils, which fabric is subsequently filled in under pressure with unvulcanized rubber. The sheet is then cut across the longitudinal axis of the coils into strips of a width suitable for the purpose for which, and the manner in which the strip is used as will be hereafter set forth. The strips thus formed are then coated with unvulcanized rubber solution and placed with their flat sides adjacent to each other upon the outside of the tire cover or casing until the desired width of the tread is obtained. By thus mounting the rings with their flat sides adjacent to each other they are all edgewise in their position on the tire so that all the component coils radiate from the tire and are free to expand and contract with the weight of the vehicle and the resistance of the road. All the rubbered wire strips are finally vulcanized both to the casing and to each other and form an elastic but solid and uncuttable tread to the tire. I may quite readily form in this way a tire with ribs or grooves to provide a better non-slipping surface by assembling strips or rings of less width or greater width alongside those of normal width.

In order that the invention may be thoroughly understood and easily carried into practical effect I have appended hereunto drawings showing examples of the same.

Figure 1:
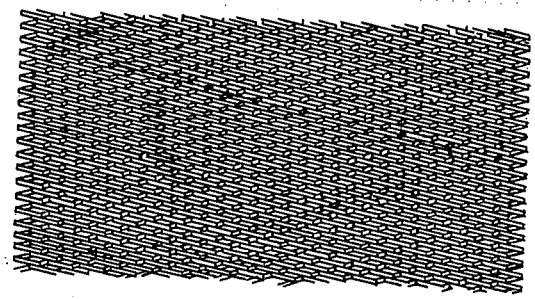
Figure 2:
Figure 3:
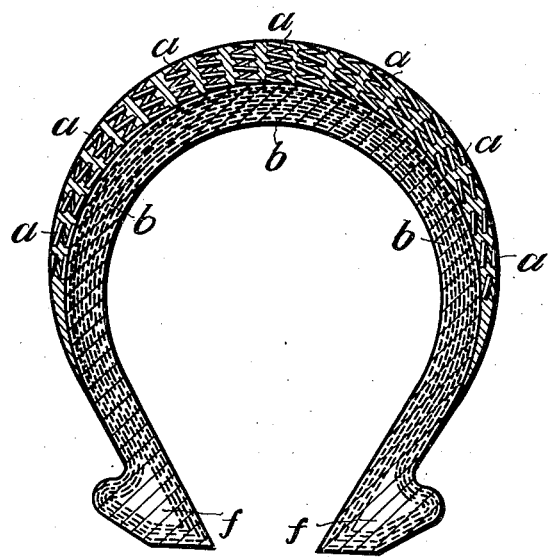
Figure 4:
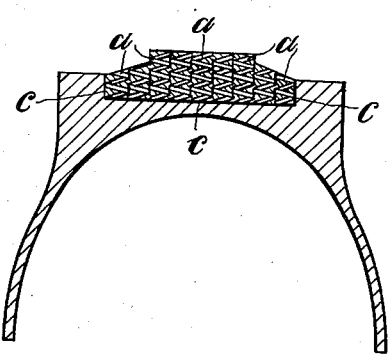
Figure 5:
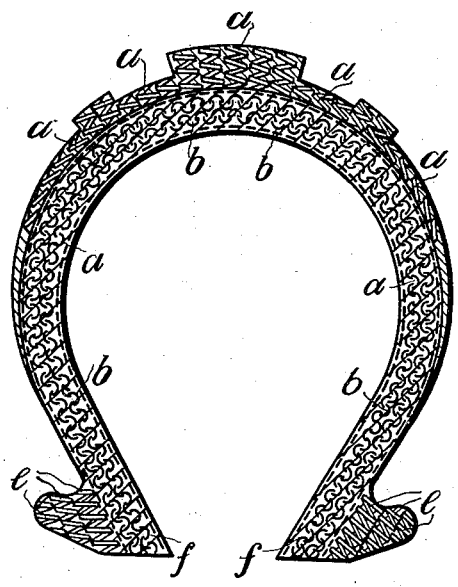

Figure 1 is a view of a portion of wire mesh in sheet form ready for receiving the rubber. Fig. 2, shows a portion of a strip cut from the sheet such as is used for assembling on a tire casing to form the tread or cover. Fig. 3, is a sectional view of a completed cover according to one method of manufacture. Fig. 4, is a sectional view of a different treaded cover with my strips wound in the trough of the tread. Fig. 5, is a section of a cover built up on a wire "former" or casing and with wired beads.

In the formation of the tire seen at Fig. 3, I weave a sheet of wire fabric consisting of interwoven helical wire coils, such as the portion represented at Fig. 1 and I completely fill in this sheet with unvulcanized rubber preferably under pressure to force the rubber into all the interstices of the sheet. The strip is then cut across the longitudinal axis of the coils into strips which may be of a length approximately corresponding to the circumference of the tire. The strips may vary in width so that a number of them when placed side by side may form a tire with any desired contour such as at Fig. 3, where *a, a, a,* represent a number of strips mounted on a canvas or other "former" or casing *b*. The strips may be made endless by joining the end coils by a coil of the same pitch and diameter or otherwise joined and are coated on the sides with unvulcanized rubber solution and then placed side by side upon the canvas or compound body or former for the cover represented by *b*, Fig. 3. The strips are then vulcanized together and to the body of the casing and a cover is provided having an elastic but extremely durable tread. It will be seen that by varying the widths and the arrangements of the strips *a* of the cover various ribbed patterns may be obtained to form non-slipping surfaces. By this means it is possible to produce in a practical way a compound wire and rubber cover with the component coils of the wire radially disposed, that is with their axes in the direction of pressure so that the maximum resiliency is obtained.

At Fig. 4, a cover with a practically flat tread of known form is shown and in the trough *c* of it I mount my rubbered wire strips *a, a, a,* edgewise side by side as previously described, thus forming a compound rubber and wire tread of great durability and neat design.

As shown at Fig. 5, a cover with a tread formed in the manner previously set forth by means of strips a, a, mounted upon it may be provided with beaded edges formed of my rubbered wire strips or rings. For this purpose I may secure by riveting or solutioning or both, two or more superposed rings e, e, of the rubbered wire fabric on the outer surface of the cover near each of its inner edges f, f. The rings are of different widths and are placed with the narrowest outward as shown so that the ordinary taper section bead is in effect obtained.

It will be understood that the methods herein set forth may be applied to forming a solid tire if desired.

What I claim and desire to secure by Letters Patent then is:

1. The herein described method of making a tire cover or the like which consists in weaving a spring fabric sheet of helical springs in interlaced relation with the axis of one spring parallel with the axes of the remaining springs and with the ends of the springs forming two edges of the sheet, in impregnating or filling the sheet thus formed with rubber under pressure, in severing the sheet across the longitudinal axes of the springs into strips, so that the axes of the interlaced springs will lie across the severed strips, and in mounting the strips side by side edgewise radially on the tire, so that the axes of the springs become radial to the tire, and vulcanizing the strips together with the ends of the springs forming the edges of the strips and the top and bottom of the cover, substantially as described.

2. The herein described method of making a tire cover or the like which consists in forming a spring fabric sheet composed of interlaced helical springs, in filling the sheets with rubber to form a yielding composite sheet-like mass composed of the rubber and springs, in cutting the sheet into strips transversely with respect to the longitudinal axes of the springs, so that the axes of the interlaced springs will lie across the severed strips, and in uniting the strips side by side to dispose the helical springs radially with respect to the tire, substantially as described.

3. The manufacture of a tire or tire cover composed of a compound rubber and woven helical wire fabric with the component helices of the latter radially disposed therein, consisting in impregnating an open metal fabric in sheet form with rubber, cutting the sheets into strips, so that the axes of the interlaced springs will lie across the severed strips, coating the strips on the sides thereof with an adhesive solution, and mounting the strips side by side so that the axes of the springs become radial to the tire, and vulcanizing them together, substantially as described.

4. The herein described method of making a tire cover which consists in forming a sheet of interwoven helical wire fabric, filling said sheet with rubber under pressure, cutting the sheet across the axes of the helices into strips, so that the axes of the interlaced springs will lie across the severed strips, mounting the strips in circles side by side edgewise upon a tire casing, so that the axes of the springs become radial to the tire, and vulcanizing the strips together and to the casing to form a complete tire cover, substantially as described.

5. The herein described method of making a tire cover or the like which consists in forming a frame of helical wire fabric, in filling the same with rubber under high pressure, cutting the frame into strips transversely with respect to the longitudinal axes of the helices, joining the ends of such strips to form rings of the circumference of the tire, and mounting the rings edgewise so that the axes of the springs become radial to the tire, and side by side on the tire and vulcanizing said rings together, substantially as described.

6. The process of making a tire or the like which consists in cutting strips from a composition sheet of wire and rubber fabric, the wire portion of the fabric consisting of interlaced helical springs, the cuts for forming said strips being taken transversely of the axes of said helical springs so that the axes of the interlaced springs will lie across the strips, assembling the strips in circles side by side so that the axes of the springs assume a radial position, and vulcanizing the strips together.

In testimony whereof I affix my signature in presence of two witnesses.

ALFRED EDMUND WALE.

Witnesses:
  F. GILBERT BRETTELL,
  E. SIMS BRETTELL.